United States Patent
Adkins et al.

(10) Patent No.: US 8,668,221 B2
(45) Date of Patent: Mar. 11, 2014

(54) AUTOMATIC COUPLING DEVICE

(75) Inventors: Jason Michael Adkins, Scott Depot, WV (US); Charles Christopher Asebes, Salt Rock, WV (US); Sudhakar Pillarisetti, Scott Depot, WV (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 603 days.

(21) Appl. No.: 12/400,036

(22) Filed: Mar. 9, 2009

(65) Prior Publication Data

US 2010/0225091 A1  Sep. 9, 2010

(51) Int. Cl.
*B60D 1/06* (2006.01)
*B60D 1/36* (2006.01)

(52) U.S. Cl.
USPC .......................................... 280/510; 280/512

(58) Field of Classification Search
USPC ......... 280/508–515, 433, 477, 507; D12/114; 24/33 R, 331, 188, 512; 213/75 R, 82
See application file for complete search history.

(56) References Cited

U.S. PATENT DOCUMENTS

| | | | | |
|---|---|---|---|---|
| 744,875 A * | 11/1903 | Neumeier | | 280/510 |
| 793,184 A * | 6/1905 | Pinlay | | 280/510 |
| 1,139,657 A * | 5/1915 | Fitzgerald | | 280/510 |
| 2,151,181 A | 3/1939 | Appell | | |
| 2,507,799 A * | 5/1950 | McNair | | 280/510 |
| 2,635,890 A * | 4/1953 | Schwartz | | 280/508 |
| 2,736,573 A * | 2/1956 | Fuschi | | 280/432 |
| 2,793,881 A * | 5/1957 | Albritton | | 280/512 |
| 2,920,907 A * | 1/1960 | Bremer | | 280/477 |
| 3,831,982 A * | 8/1974 | Bernhardt et al. | | 280/511 |
| 4,657,275 A | 4/1987 | Carroll | | |
| 4,657,276 A | 4/1987 | Hamerl | | |
| 4,708,359 A | 11/1987 | Davenport | | |
| 4,844,496 A | 7/1989 | Webb et al. | | |
| 4,961,590 A | 10/1990 | Davenport | | |
| 5,080,386 A | 1/1992 | Lazar | | |
| 5,758,893 A | 6/1998 | Schultz | | |
| 6,382,653 B1 | 5/2002 | Bass | | |
| 7,100,935 B1 * | 9/2006 | Dunbar | | 280/433 |
| 7,770,910 B1 * | 8/2010 | Shirk, Jr. | | 280/433 |

* cited by examiner

*Primary Examiner* — Anne Marie M Boehler
(74) *Attorney, Agent, or Firm* — Gifford, Krass, Sprinkle, Anderson & Citkowski, P.C.

(57) ABSTRACT

A device for coupling a vehicle to a trailer is provided. The device includes a base having a channel and a pair of side walls. The channel includes a mouth leading into a stop. The side walls are spaced apart from each other and the channel runs generally between the side walls. A catch is pivotally mounted between the side walls. The catch includes a mounting end, a catch end, and a contact surface. The catch end is pivotable between a first position, wherein the catch end abuts against the base; and a second position wherein the catch end is displaced from the base. The tow pin engages the contact surface of the catch and pivots the catch end towards the second position. The catch end returns to the first position so as to secure the tow pin between the catch end and the stop when the tow pin abuts against the stop.

7 Claims, 3 Drawing Sheets

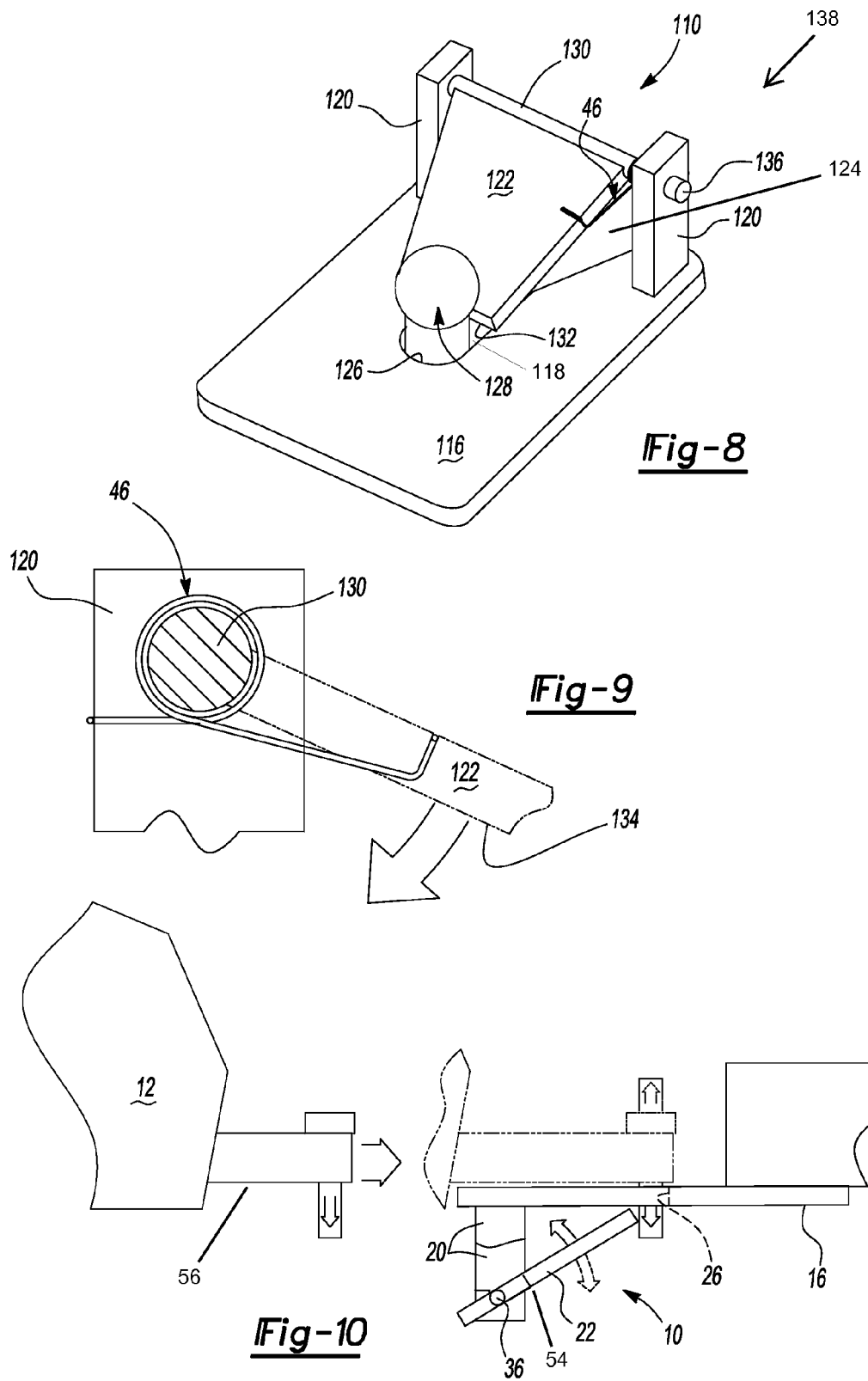

AUTOMATIC COUPLING DEVICE

FIELD OF THE INVENTION

The present invention relates to a device for coupling a vehicle to a trailer. More particularly the present invention relates to a device that aligns and automatically locks the vehicle to the trailer. The device includes a base plate having a channel, and a catch pivotably mounted onto the base plate.

DESCRIPTION OF THE PRIOR ART

Devices for coupling vehicles to trailers are well known. Such devices are commonly configured to engage a tow pin. Coupling a vehicle to a trailer may pose difficulties. For instance some people find it difficult to align the trailer to the tow pin. Accordingly, it is known to use V-shaped channels to help guide the tow pin to a locking position. However, once the vehicle is aligned a person must manually lock the vehicle to the trailer.

Known devices that mechanically couple the trailer to the vehicle require moving parts. For instance it is known to have a device that includes a manually operated lever that engages a tow pin so as to trap the tow pin within the socket of a trailer head. In another example of a known coupling device, the device includes a socket housing having an opening, a pair of opposing slots, and a retaining member that is manually fitted between the slots so as to enclose the opening and secure the tow pin therein. Such devices require someone to manually lock the trailer to the vehicle.

Accordingly it is desirable to have a coupling device that not only helps guide the tow pin into alignment with the device but also automatically latches the device to the tow pin. It is further desirable to have a device of simple construction so as to reduce the potential for failure due to numerous parts interlocking and moving about each other. It is also desirable to have a device operable to automatically couple a vehicle to a trailer that does not have as many parts as current devices do so as to reduce production costs.

SUMMARY OF THE INVENTION

A device for coupling a vehicle to a trailer is provided. The tow pin may be mounted on one of either the vehicle or the trailer and the device is mounted on the other of either the trailer or the vehicle. The device includes a base having a channel. The channel includes a mouth that leads into a stop. The device also includes a pair of side walls mounted onto the base. Each of the side walls is spaced apart from the other and the channel runs generally between the pair of side walls. A catch is pivotally mounted between the pair of side walls. The catch includes a mounting end, a catch end, and a contact surface. The catch end is pivotable between a first position and a second position. In the first position, the catch end abuts against the base, and in the second position the catch end is displaced from the base. The mounting end is spaced apart from the base so as to provide clearance for the tow pin to enter the mouth of the channel. When the tow pin comes into contact with the contact surface of the catch, the catch end is pivoted towards the second position. When the tow pin passes the catch end, the catch end returns to the first position so as to secure the tow pin between the catch end and the stop.

BRIEF DESCRIPTION OF THE DRAWINGS

FIG. 8 is an illustration of the device being urged to engage the base as the tow pin has cleared the catch end, so as to retain the catch against the base of the device and secure the tow pin between the catch end and the stop;

FIG. 9 is an illustration showing the biasing force of the retaining device; and FIG. 10 is an illustration showing the device and tow pin mounted to the underside of a trailer and vehicle respectively.

DETAILED DESCRIPTION OF THE INVENTION

Figure 1:
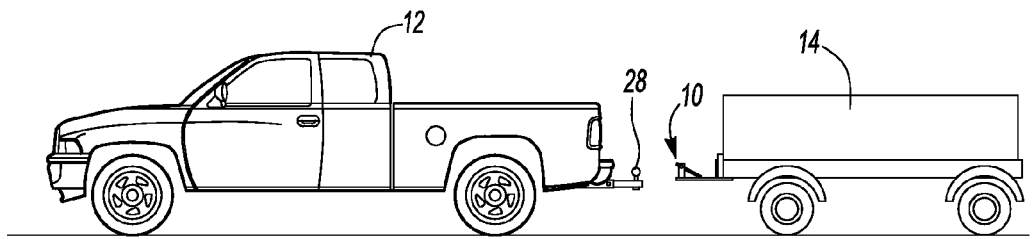
FIG. 1 is an illustration of the device mounted onto a trailer, and a vehicle having a ball shaped tow pin mounted onto the rear bumper.

The present invention relates to a device 10 for coupling a vehicle 12 to a trailer 14. Specifically the device 10 includes a base 16 having a channel 18, a pair of side walls 20 mounted onto the base 16, and a catch 22 pivotally mounted between the pair of side walls 20. The channel 18 runs between the pair of side walls 20 and includes a mouth 24 and a stop 26. The channel 18 is configured to engage a tow pin 28 such that the tow pin 28 can travel from the mouth 24 to the stop 26. Preferably the base 16 is made of a rigid material such as steel.

The catch 22 is pivotable between a locked position 38 (referenced herein also as a first position) and an unlocked position 40 (referenced herein also as a second position). The catch 22 includes a mounting end 30 spaced apart and opposite a catch end 32, and a contact surface 34. The mounting end 30 may further include a pair of arms 36 disposed opposite each other. The mounting end 30 extends between each side wall 20 and is pivotally mounted thereon. The mounting end 30 is spaced apart from the channel 18 so as to provide clearance for the tow pin 28. Specifically as the tow pin 28 enters the mouth 24 of the channel 18, the tow pin 28 must be free to travel the length of the channel 18 to the stop 26.

The catch end 32 extends away from the mounting end 30 and is spaced apart from the stop 26 of the channel 18. Specifically, the tow pin 28 must be able to fit between the stop 26 and the catch end 32. Thus, the tow pin 28 is held between the catch end 32 and the stop 26 when the catch end 32 is in the first position 38.

Figure 2:
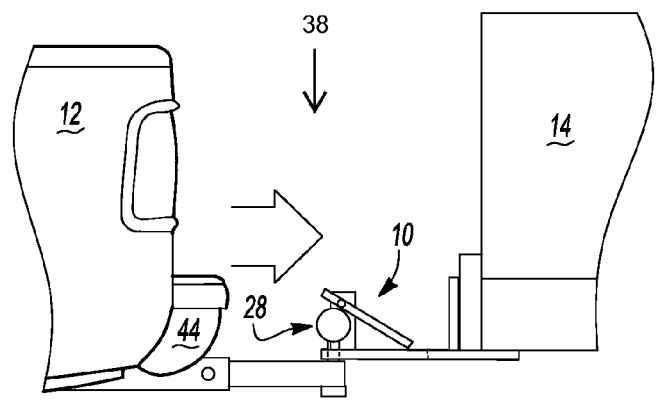
FIG. 2 is an illustration of the tow pin entering into the mouth of the device.
Figure 3:
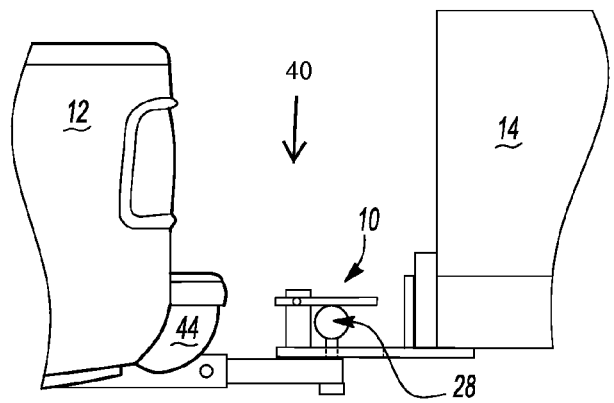
FIG. 3 is an illustration of FIG. 2 showing the tow pin urging the catch away from the base of the device.
Figure 4:
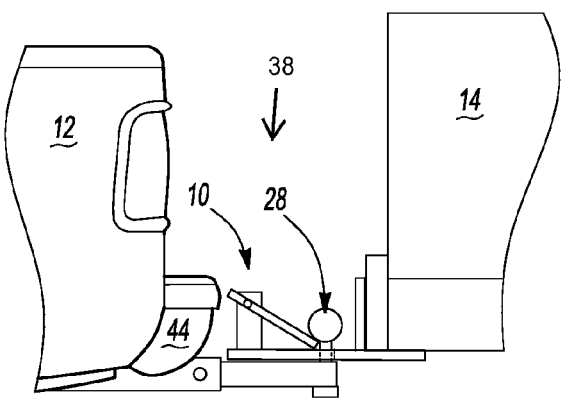
FIG. 4 is an illustration of FIG. 2 showing the catch returning to the base after the tow pin clears the catch end of the device.

With reference now to FIGS. 2-4 an illustration of the operation of the device 10 is provided. Generally, the catch end 32 is moved from the first position 38 to the second position 40, and back to the first position 38. Specifically, the tow pin 28 enters the mouth 24 of the channel 18 and continues along the channel 18 until the tow pin 28 reaches a predetermined location along the channel 18. At the predetermined location, the tow pin 28 engages the contact surface 34 of the catch 22 and begins to urge the catch 22 away from the base 16 towards the second position 40. The channel 18 guides the tow pin 28 to the stop 26. When the tow pin 28 is guided past the catch end 32, the catch end 32 is urged to the first position 38. The tow pin 28 is now secured between the catch end 32 and the stop 26 of the channel 18.

Figure 5:
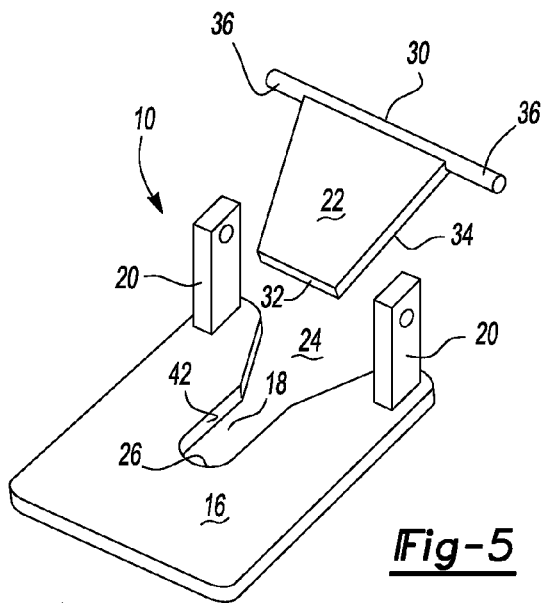
FIG. 5 is an exploded view of the device including a retaining device operable to urge the catch to engage the base.

With reference now to FIG. 5 a first preferred embodiment of the device 10 is provided. The device 10 includes a generally V-shaped channel 18 so as to help guide the tow pin 28 to the stop 26. Specifically, the mouth 24 is wider than the stop 26 so as to provide more tolerance for the driver as the driver is maneuvering either the vehicle 12 or the trailer 14 to align with the other. The channel 18 further includes a channel wall 42 forming the V shape. The tow pin 28 is directed towards the stop 26 as the tow pin 28 slidably engages the channel wall 42.

The tow pin 28 is mounted to a rear bumper 44. The device 10 is shown mounted to a trailer 14. The side walls 20 extend upwardly from the base 16. The mounting end 30 of the catch 22 is pivotably mounted to the side walls 20 such that the mounting end 30 is disposed above the channel 18. The catch 22 is tilted such that the catch end 32 rests against the base 16.

The V-shaped channel 18 provides a greater target area for aligning the tow pin 28 to the stop 26, thus making the coupling of the vehicle 12 to the trailer 14 relatively easier for the operator. Accordingly, the precision required to align the device 10 and couple the vehicle 12 to the trailer 14 has been reduced.

As the tow pin 28 enters the opening of the mouth 24 of the channel 18 the tow pin 28 slidingly engages the channel wall 42 and is guided towards the stop 26. The tow pin 28 passes underneath the mounting end 30 of the catch 22 and continues along channel 18 towards the stop 26. Eventually, the tow pin 28 comes into contact with the contact surface 34 of the catch 22 and urges the catch end 32 away from the base 16 towards the second position 40. Once the tow pin 28 passes the catch end 32, gravity urges the catch end 32 to return to the first position 38 thus securing the tow pin 28 between the catch end 32 and the stop 26. Disengaging the tow pin 28 from the device 10 may be done by simply lifting the catch end 32 away from the base 16, and positioning the tow pin 28 out of the channel 18.

With reference now to FIG. 10 a vehicle 12, referenced herein as a tow up/down vehicle 12, equipped with what is commonly referred to in the art as an up/down tow pin 28 is provided. An up/down tow pin 28 is a tow pin 28 which is automatically moved vertically between an "up" position and a "down" position. In the up position, the tow pin 28 extends beyond the upper surface of the rear bumper 44, and in the down position, the tow pin 28 recedes into the rear bumper 44.

The device 10 may be coupled to a tow up/down vehicle 12. When the tow pin 28 is in the up position, the tow pin 28 is operable to pivot the catch end 32 to the second position 40 so as to be secured between the catch end 32 and the stop 26 in the manner described above. Likewise, the device 10 may be removed from the tow up/down vehicle 12 by simply positioning the up/down tow pin 28 in the down position.

With reference now to FIGS. 6-9 a second preferred embodiment of the device is provided. Like reference numerals have been increased by 100. The device 10 includes a retaining device 46. The retaining device 46 operable to retain the catch end 132 against the base 116 after the tow pin 128 has been secured to the device 110. The retaining device 46 is shown as a coil spring 48. The coil spring 48 includes a first leg 50 opposite a second leg 52. The first leg 50 is configured to engage the catch 122 and the second leg 52 is configured to engage one of the side walls 120. An arm 136 of the mounting end 130 is fitted through the coiled body of the coil spring 48. The first leg 50 is mounted onto the catch 122, and the second leg 52 is mounted onto one of the sidewalls 120.

Figure 7:
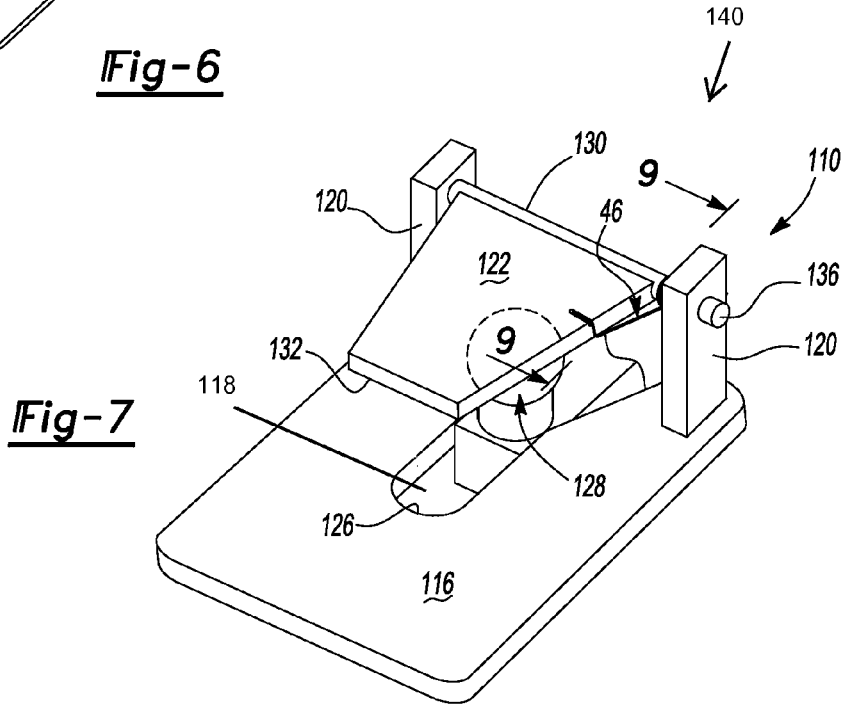
FIG. 7 is an illustration showing the device being biased by the movement of the tow pin against the catch.

With reference again to FIGS. 7-9, an illustration of the operation of the retaining device 46 is provided. The retaining device 46 is operable to urge the catch 122 towards the first position 138. As the tow pin enters the channel 118 and proceeds towards the mouth 124, a portion of the tow pin 128 contacts the contact surface 134 of the catch 122 and urges the catch 122 towards the second position 140, as shown in FIG. 7. With reference now to FIGS. 8 and 9, the retaining member urges the catch 122 to the first position 138 once the tow pin 128 has cleared the catch end 132, thus securing the tow pin 128 between the catch end 132 and the stop 126.

Alternatively, the retaining device 46 may be a magnet (not shown) having sufficient magnetic force so as to retain the catch end 132 against the base 116 when the device 110 experiences common loads from driving such as road bumps and the like.

Figure 6:
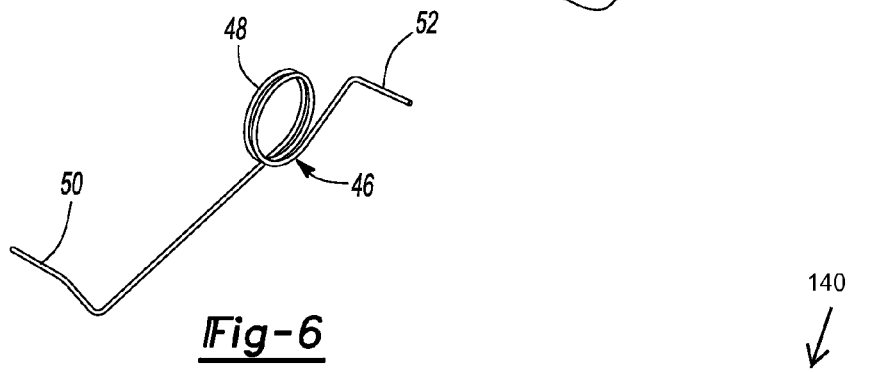
FIG. 6 is an illustration of an embodiment of the retaining device.

With reference now to FIG. 10 the device 10 mounted to the underside of a trailer is provided. The device 10 includes a mechanism 54 operable to urge the catch 22 toward the base 16 and into the first position 38. This configuration is preferable for vehicles 12 that have a tow pin 28 mounted to the underside of the vehicle body 56. Thus as the tow pin 28 enters the channel 18 the tow pin 28 will come into contact with the contact surface 34 of the catch 22 and urge the catch 22 away from the base 16. As the tow pin 28 passes the catch 22, the mechanism 54 is free to urge the catch end 32 back towards the base 16 thus securing the tow pin 28 between the stop 26 and the catch end 32. With reference now to FIG. 6, the mechanism 54 is shown as a coil spring 48. However, it is anticipated that other the mechanism 54 may be a magnet or another type of spring such as a leaf spring, spring legs or a rubber band.

The invention claimed is:

1. A device for coupling a vehicle to a trailer, wherein one of either the vehicle or the trailer includes a tow pin extending upwardly with respect to the ground, and wherein the device is mounted onto other of either the trailer or the vehicle, the device comprising:

a planar base having a channel, the base disposed on a horizontal plane and generally orthogonal to the tow pin, the channel configured to receive the tow pin, the channel including a mouth and a stop, wherein the mouth of the channel leads into the stop;

a pair of side walls mounted onto the base and extending upwardly from the base, wherein each of the pair of side walls is spaced apart from the other, and wherein the channel extends transversely between the pair of side walls; and a catch mounted to pivot between the pair of side walls and above the base, the catch including a mounting end and a catch end, wherein the catch end is pivotable between a locked position and an unlocked position, the catch further including a contact surface extending between the mounting end and the catch end, wherein the mounting end is spaced apart from the base so as to provide clearance for the tow pin, the tow pin received between the pair of side walls and extending transversally along the plane of the base and engaging the contact surface so as to move the catch from the locked position to the unlocked position, gravity placing the catch in the locked position, when the tow pin is pushed past the catch end, wherein in the locked position the catch end abuts against the base so as to hold the tow pin between the catch end of the catch and the stop of the base.

2. The device as set forth in claim 1 wherein the channel includes a pair of side walls opposite each other and configured to have a generally v-shape so as to help guide the tow pin to the stop.

3. The device as set forth in claim 1 further including a retaining member operable to retain the catch in the locked position.

4. The device as set forth in claim 3 wherein the retaining member is a coil spring having a coiled body and a first leg opposite a second leg, wherein the coil spring is mounted onto the catch and is operable to further urge the catch into the locked position.

5. The device as set forth in claim 3 wherein the retaining member is a magnet disposed on the base, the magnet operable to further urge the catch into the locked position.

6. The device as set forth in claim 1, wherein the device is formed of metal.

7. The device as set forth in claim 1, wherein the pair of side walls is integrally formed with the base.

* * * * *